June 15, 1965  A. WEILAND  3,188,787
ROTARY DISK LAWN MOWER
Filed Jan. 15, 1962  2 Sheets-Sheet 1

INVENTOR.
ALFRED WEILAND
BY Robert M. Barr
ATTORNEY

June 15, 1965  A. WEILAND  3,188,787
ROTARY DISK LAWN MOWER
Filed Jan. 15, 1962  2 Sheets-Sheet 2

INVENTOR.
ALFRED WEILAND
BY
*Robert M. Barr*
ATTORNEY

United States Patent Office 3,188,787
Patented June 15, 1965

3,188,787
ROTARY DISK LAWN MOWER
Alfred Weiland, 200 Haven St., Clearwater, Fla.
Filed Jan. 15, 1962, Ser. No. 166,314
2 Claims. (Cl. 56—25.4)

The present invention relates to a lawn care unit and more particularly to a more efficient and safe blade mower wherein the collection of grass cuttings, leaves and debris on lawns, walks and roadways are more efficiently carried out.

Another object is to provide an improved safe rotary blade mower to operate in association with a collector such as shown in Patent No. 3,006,128 but differing therefrom for a correlated result not heretofore attained.

Another object is to provide an improved rotary blade mower wherein the collection of wet cuttings at the entrance to the discharge passage are prevented by being automatically removed.

Another object is to provide a rotary blade mower wherein novel guards protect the operator, a bystander or adjacent property from accidental contact with the blade and from flying debris from the mower housing and also to reduce the escape of air, cuttings, and mulch from under the housing.

A further object is to provide a rotary blade mower wherein a supplemental air is supplied above the blade to reduce the suction on the grass and thereby reduce the power required to push the mower while increasing the efficiency of the impeller action of the blade.

A still further object is to provide a novel baffle assembly wherein the air pressure at the cuttings discharge passage into the collecting receptacle is increased to thereby counteract the whirling action of the air return.

Other objects will appear hereinafter.

Figure 1:
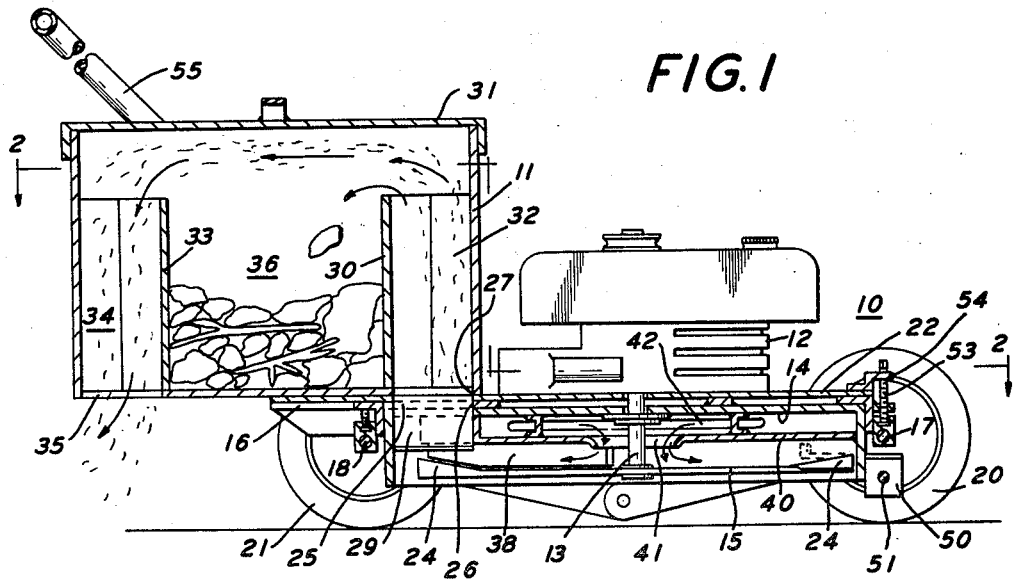
FIG. 1 is a medial sectional elevation view of a lawn care unit embodying one form of the invention as would be seen when viewed along the line 1—1 of FIG. 2.
Figure 2:
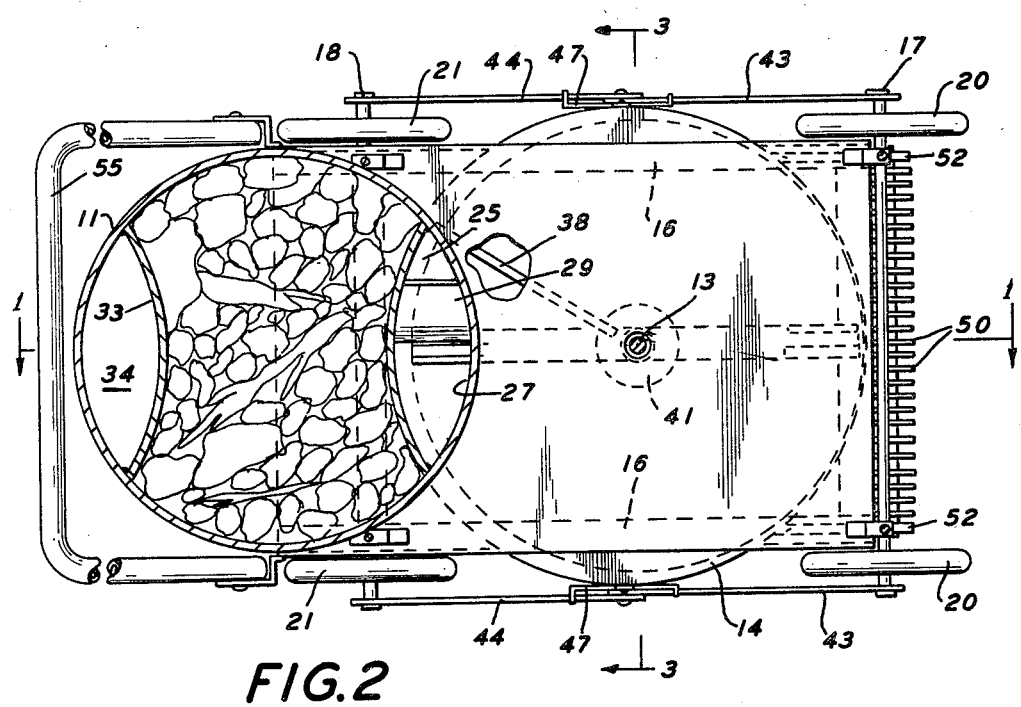
FIG. 2 is a section view on line 2—2 of FIG. 1 with certain parts omitted for purpose of clarity.
Figure 3:
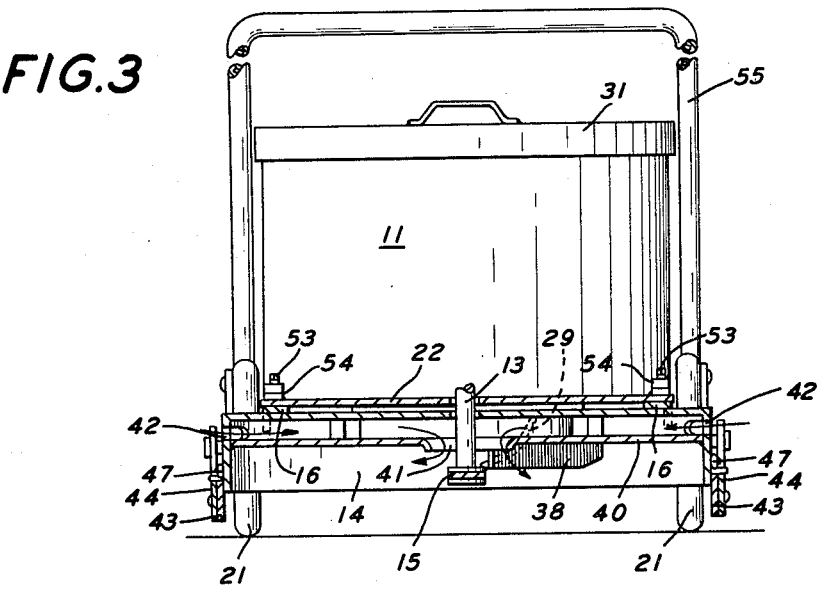
FIG. 3 is a section view on line 3—3 of FIG. 2.
Figure 4:
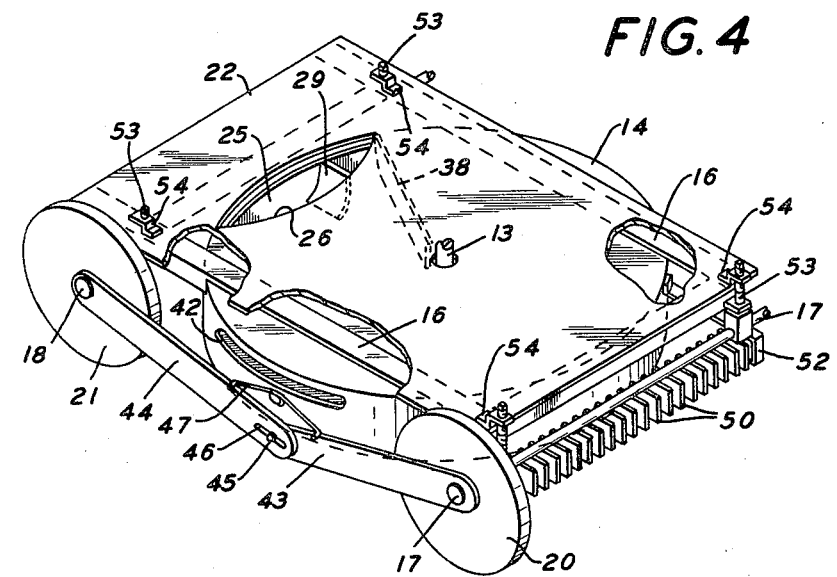
FIG. 4 is an isometric view of the chassis partly broken away.
Figure 5:
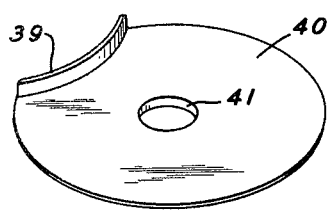
FIG. 5 is an isometric view of the baffle plate for guiding air into the mower housing.

Referring to the drawings the unit of the invention comprises the combination of a rotary power mower 10 and a receptacle 11 for collecting and sorting material as discharged from the mower. The mower 10 includes a conventional gas engine 12 having a shaft 13 projecting vertically downward into an open bottom cylindrical housing 14 to drive the grass cutting blade 15. The housing 14 is carried by two spaced apart angle bars 16 extending between and end supported by axles 17 and 18 which serve respectively as journals for front and rear wheels 20 and 21. That portion of each angle bar lying between the opposite sides of the housing rim has its depending flange cut-off in order not to interfere with air flow as will hereinafter be described. A cover plate 22 overlies the top of the housing 14 to seat the motor 12 while also serving as a support for the receptacle 11. The plate 22 is provided with openings respectively for the passage of the shaft 13 and other parts below the plate.

The blade 15 is preferably a steel strip with sharpened cutting edges and is connected at its center to the shaft 13, while terminating at its end respectively in upstanding angularly disposed impellers 24 to discharge the cuttings into the receptacle 11.

As a discharge from the interior of the housing an arcuate slot 25 is cut in the top of the housing to form with the housing rim an outlet of substantially elliptical contour disposed above the path of travel of the blade 15. The margin 26 of the slot 25 is generated on a radius having the center of the receptacle as its center while the rim margin is generated on a radius about a center offset from the shaft 13. Both centers are on the median line of the unit. When the receptacle is in operative position, it will be seated upon the plate 22 over the slot 25 with its wall coincident with the aforesaid margin 26.

In order to establish free discharge of cuttings into the receptacle a slot 27 is formed in the bottom of the receptacle of the same size and shape as the slot 25 and is located to form a continuation of that slot 25. Also the plate 22 has a slot of the same size and shape as the slot 27 and positioned to coincide therewith and thus complete free communication between the housing 14 and the receptacle 11.

For association with the rotary blade mower the receptacle 11 is an open top cylindrical body having a partition 30 rising from the bottom to terminate in spaced relation to a cover 31 over the open end. The partition 30 has an arcuate contour to form, with the wall of the receptacle, an elliptical passage 32 leading from the bottom inlet slot 27 as a mating continuation thereof.

Also there is a second partition 33 rising from the receptacle bottom at the opposite end thereof and terminating in spaced relation to the cover 31. This partition 33 has an arcuate contour to form, with the wall of the receptacle, an elliptical passage 34 which communicates at the bottom with an elliptical discharge slot 35 in such bottom. Thus the two partitions form a chamber 36 therebetween which communicates with the path of discharging material through the passages 32 and 34. By this assembly heavy cuttings and debris drop by gravity into the chamber 36 while the light fines travel down the passage 34 to discharge upon the ground as a mulch. Generally considered this interior assembly resembles that of applicant's Patent 3,006,128 but differs materially therefrom in its functional operation to give the desired new result, namely automatic removal of wet cuttings by the sweep of the cutter blade through the inlet to passage 32.

As a means to effectively guide the cuttings from the blade discharge into the outlet 25, a chute 29 is welded or otherwise made fast to the housing 14 in an inclined position below the outlet 25. The upper end of the chute 29 projects partly through the outlet 25 and the receptacle slot 27 to thereby create a suction action on the order of a nozzle.

As a means to improve the efficiency of the fan and increase the pressure within the housing 14, a baffle 38 is mounted in the housing to extend radially from the housing center to the housing wall. The vertical width of this baffle is such that its lower edge lies in a plane in relatively close proximity to the path of the cutting blade 15. Thus any cuttings improperly carried by the blade are swept off and redirected to the discharge slot instead of travelling around and around to cause clogging. With reference to the travel of the blade 15, it should be noted that the off-center radius relation gives the blade 15 a path of travel under the discharge outlet 25 at one side of the housing and just out of contact with the housing wall at the other side. This construction lessens the danger of clogging. Further the added spacing of the blade from the outer margin of the slot 25 creates more clearance at the discharge outlet under the receptacle. If the quantity of grass delivered by the blade 15 exceeds the capacity of the outlet passage when the mower travels through exceptionally high or thick grass and leaves, this material falls back on the cutter blade when the cutting is reduced to normal by reducing the forward travel speed of the mower.

In order to increase the flow of air through the housing a circular baffle plate 40 is positioned within the housing in spaced relation to its top and having a center aperture 41 encircling the axis of the blade. Such plate 40 is anchored by welding to the inner wall of the housing rim. That portion of the disc 40 adjacent the discharge passage is cut away to form an arcuate flange 39 to mate the curvature of the outlet 25. Opposite sides of the housing wall are each provided with an inlet slot 42 to direct air into the space above the plate 40 and then through the aperture 41 in response to blade suction. Also the baffle plate 40 serves to stiffen the deck and wall of the housing and prevent flutter of the blade and noisy vibrations as well as loosening of connected parts.

In order to prevent users of the mower, or others, from injury due to their feet or hands getting into the path of the rotating blade, as well as to prevent broken blades and debris from flying out of the housing to cause damage, each side of the carriage is provided with a pair of flat links 43 and 44, the former 43 being pivoted to the axle 17, and the latter pivoted to the axle 18. The free ends of the two links overlap medially of the carriage and are pivotally connected together by a bolt 45 traversing holes in the respective links, such connection including a slot 46 as the hole in the link 18, whereby a lost motion makes possible the rise fall of the links in response to variations in the ground level. The length of the links is such that normally they are suspended as a guard terminating in close proximity to the ground while closing the space between the bottom of the housing and the ground. Preferably a spring 47 is medially attached to the housing so that its free ends bear respectively upon the top edges of the links to thereby give a steadying action as the links rise and fall over ground undulations.

As a further means to protect the user from injury by the blade, the front end of the mower is provided with a guard depending a predetermined distance from the housing 14, to enter below the top level of the grass, such guard being in the form of a row of relatively flat steel discs 50 carried by a transverse rod 51 connected by brackets 52 projecting from housing 14.

The respective wheel axles 17 and 18 are carried by bolts 53 in threaded engagement with brackets 54 attached to the cover plate 22 for adjustment purposes.

A handle 55 is attached to the rear portion of the plate 22 and is of U-shape to straddle the receptacle 11 when the latter is in collecting position. This handle serves as a manual means for pushing the mower or as a guiding means when it is self-propelled.

It will now be apparent that a novel rotary blade mower has been devised which is not only an efficient grass cutter but also operates to limit the collection of wet cuttings at the discharge of the housing. Furthermore the mower of the invention includes the use of a supplemental supply of air which discharges above the blades to coact with the impeller action for more efficient operation.

The partition or plate 40, by which the supplemental air is delivered above the blade is rigidly connected to the housing to make a smooth surface uninterrupted by motor mounting bolts. Also this plate 40 makes it possible to use lighter metal in the housing while assuring a very stiff structure resisting engine vibration with resulting blade flutter.

Also a baffle is located in the blade housing and so positioned with respect to the path of travel of the blade that cuttings otherwise carried around and around are swept from the blades and fall directly into the path of the discharge and thence to the entrance of the collecting receptacle.

Attention is particularly directed to the side guards depending from the mower frame over the space between the housing and the ground as a protection against injury by the blade. These guards are self-adjusting to compensate for undulations of the lawn.

In the foregoing specification and accompanying drawings I have illustrated my improved lawn mower unit in the preferred form but it will be understood that the invention is not limited to the particular structure therein disclosed except insofar as covered by the claims.

Having now described my invention, I claim:

1. A lawn care unit comprising a rotary power mower including a vertically disposed shaft, a cutting blade attached to said shaft, impelling means on said blade, an open bottom cylindrical housing for said blade, said housing being formed by a top wall and an annular rim, a plate transversely disposed in said housing in spaced parallel fixed relation to the top thereof to form an air plenum having an air entrance formed in the rim of the housing above said plate, said plate having an aperture therein coaxial with the cutting blade shaft through which air is drawn into the housing by the rotating blade, said housing having an air discharge outlet at the rear end thereof, and means communicating with said outlet to collect cuttings discharged from said housing.

2. A lawn care unit according to claim 1 wherein said collecting means is a receptacle having an inlet communicating with said outlet and an outlet located to discharge upon the ground, and wherein is included mobile means mounting said mower and said receptacle in operative association with one another.

References Cited by the Examiner

UNITED STATES PATENTS

| 2,511,124 | 6/50 | Phelps | 56—25.4 |
|---|---|---|---|
| 2,882,668 | 4/59 | Murillo | 56—25.4 |
| 2,910,818 | 11/59 | Beal et al. | 56—25.4 |
| 2,929,186 | 3/60 | Bundy | 56—25.4 |
| 2,942,396 | 6/60 | Farnam | 56—25.4 |
| 2,953,887 | 9/60 | Boesch et al. | 56—23 |
| 2,953,888 | 9/60 | Phillips et al. | 56—25.4 |
| 2,990,666 | 7/61 | Blume | 56—25.4 |
| 3,006,128 | 10/61 | Weiland | 56—194 |
| 3,049,854 | 8/62 | Denny | 56—25.4 |
| 3,077,718 | 2/63 | McLaughlin | 56—25.4 |

T. GRAHAM CRAVER, *Primary Examiner.*

CARL W. ROBINSON, ANTONIO F. GUIDA,
*Examiners.*